Dec. 4, 1962   W. B. JACKSON ETAL   3,066,342
SMEAR TEST SAMPLER FOR RADIOACTIVE AND BACTERIOLOGICAL SURVEYS
Filed Dec. 4, 1959   2 Sheets-Sheet 1

INVENTORS
WALTER B. JACKSON
GEORGE N. JOHANSON
AND LESTER F. LOWE
BY
ATTORNEYS

Dec. 4, 1962　　W. B. JACKSON ETAL　　3,066,342
SMEAR TEST SAMPLER FOR RADIOACTIVE AND BACTERIOLOGICAL SURVEYS
Filed Dec. 4, 1959

INVENTORS
WALTER B. JACKSON
GEORGE W. JOHANSON
AND LESTER F. LOWE
BY
Wade Koontz
Sherman W. Goldman
ATTORNEYS

United States Patent Office 3,066,342
Patented Dec. 4, 1962

3,066,342
SMEAR TEST SAMPLER FOR RADIOACTIVE AND BACTERIOLOGICAL SURVEYS
Walter B. Jackson and George W. Johanson, Waltham, and Lester F. Lowe, Ashland, Mass., assignors to the United States of America as represented by the Secretary of the Air Force
Filed Dec. 4, 1959, Ser. No. 857,473
5 Claims. (Cl. 15—104)
(Granted under Title 35, U.S. Code (1952), sec. 266)

The invention described herein may be manufactured and used by or for the United States Government for governmental purposes without payment to me of any royalty thereon.

This invention relates generally to holders for tape and more particularly to a paper tape holder suitable for smear testing for radioactively exposed materials or for bacteriological smear tests.

In accordance with the Atomic Energy Act, it is required to take smear tests of the surroundings wherever radioactive materials are in use. Instruments for this process must provide protection for the user from contamination and at the same time be facile of operation. It is also desirable to avoid contamination of the smear test sampling instrument by eliminating its contact with the article to be tested.

The foregoing requirements are achieved by means of a hand-held holder containing standard recorder tape which is fed over a protrusion on the holder. A cutting edge is provided for removing the portion of tape that has been used in a test.

Accordingly, it is an object of this invention to provide a novel smear test sampler which enables the taking of radioactivity surveys without contaminating the operator of the instrument or the instrument itself.

It is another object of this invention to provide a smear test sampler capable of being manufactured of conventional, currently available materials that lend themselves to standard mass production manufacturing techniques.

It is still another object of this invention to provide a smear test sampler that utilizes standard recorder tape.

It is a further object of this invention to provide a smear test sampler suitable for use in either radioactive or bacteriological testing.

It is a still further object of this invention to provide a smear test sampler which confines the smear to a specific area on paper tape.

Another object of this invention involves the provision of a smear test sampler having a body portion on top of which is mounted a yoke with means for supporting a roll of paper, a handle secured to one end of said body portion, a sharp cutting edge at the end of said body portion opposite said handle, a pair of slots in said body portion, a pair of guides for said paper on the side opposite the yoke, means between said guides for extending paper that is fed between said guides beyond the outermost portion of said guides, and means for creating a drag on the roll of paper in said yoke.

These and other advantages, features and objects of the invention will become more apparent from the following description taken in connection with the illustrative embodiment in the accompanying drawings, wherein.

Figure 1:
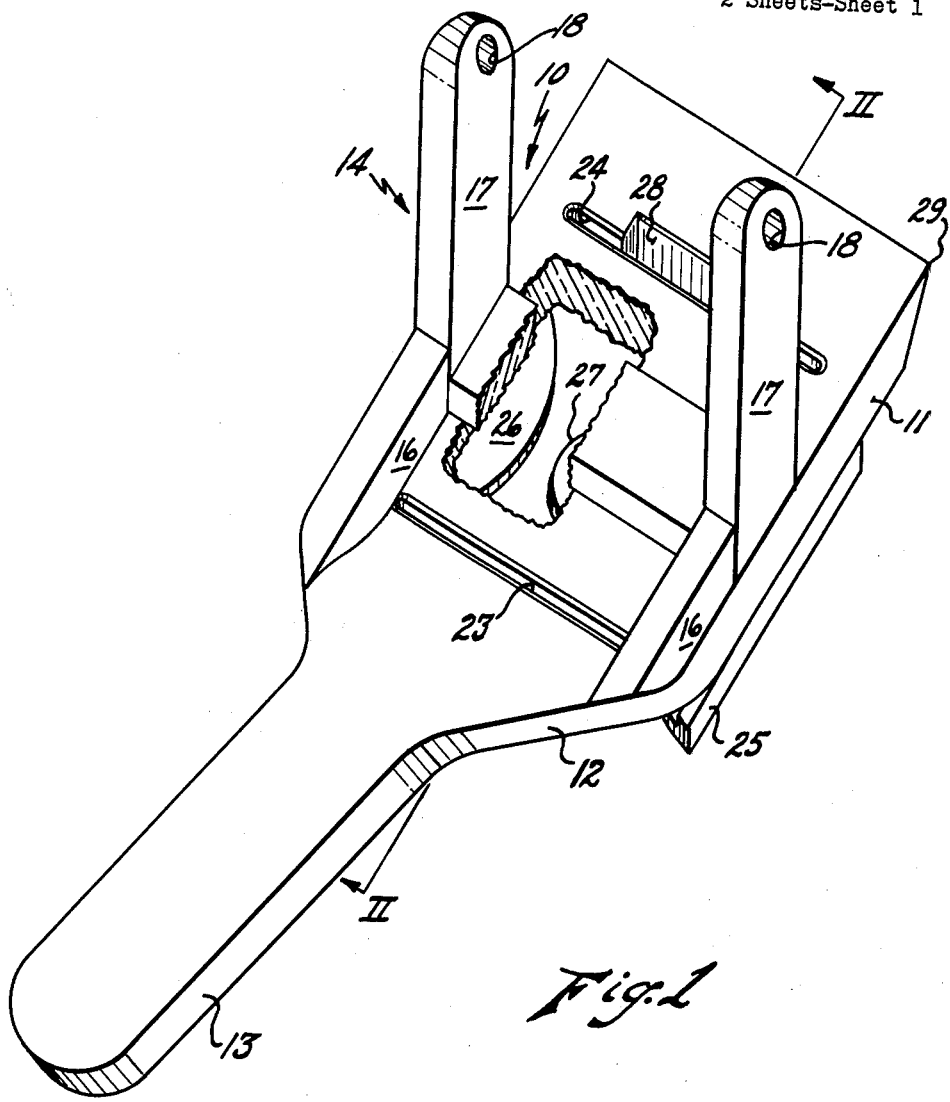
FIGURE 1 is an isometric view of the smear test sampler of this invention.
Figure 2:
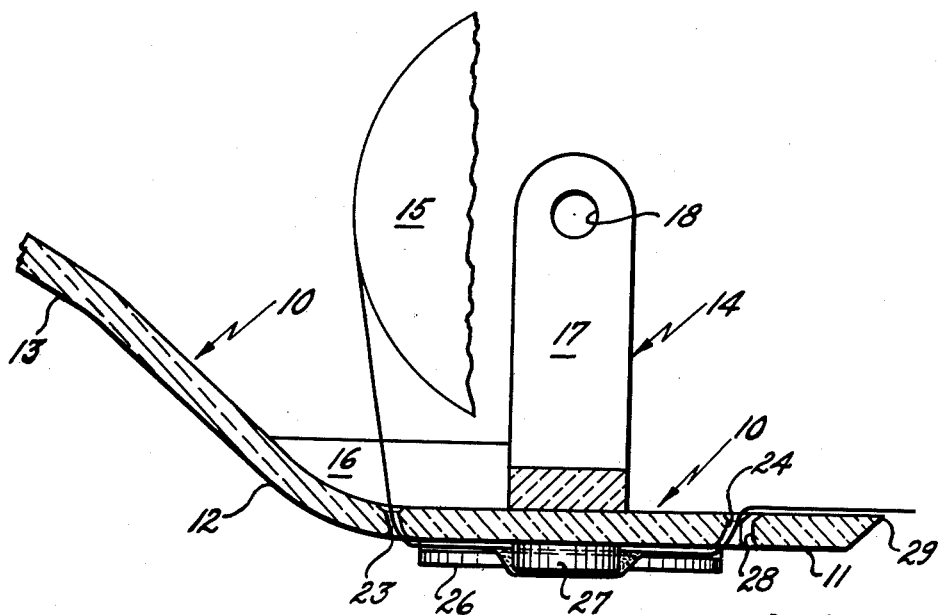
FIGURE 2 is a view taken along line II—II of FIGURE 1.

Referring to the figures, 10 represents a body having a horizontal, flat portion 11 which tapers at 12 to form a reduced section 13 at one end which is suitable for use as a handle. Portions 12 and 13 are bent up from the plane of the remainder of the body 11. A generally channel-shaped yoke 14 is mounted on body portion 11 by any suitable fastening means and may also be secured to stiffening members 16. The upright legs 17 of the yoke 14 are bored at 18 to receive an axle 19 comprising a bolt 20 and nut 21. The height of the upstanding legs 17 of yoke 14 to the axle 19 and the diameter of the body of bolt 20 are arranged to accommodate a standard roll of 2¼ inch recording tape 15.

Figure 3:
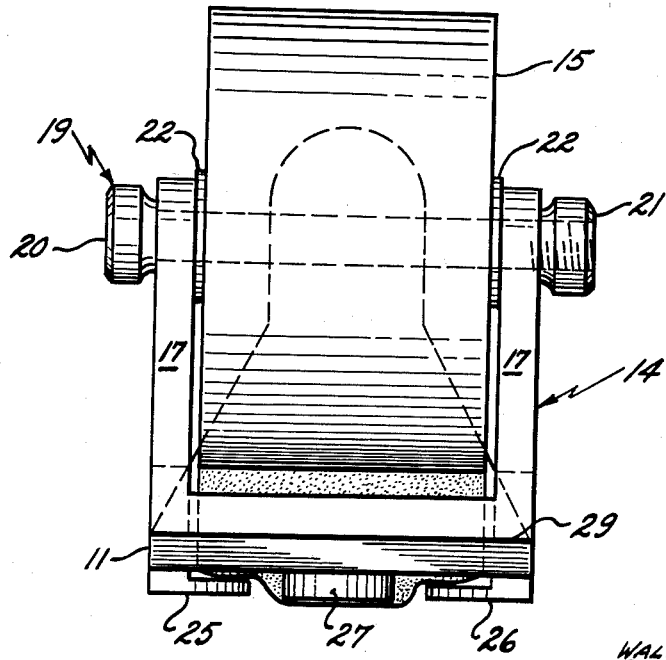
FIGURE 3 is an end view of the smear test sampler with means for supporting a roll of paper.

In order to create a drag on the roll of tape, a pair of spacer washers 22, FIG. 3, are provided which, upon tightening of bolt and nut elements 20 and 21, bind against the roll 15. Of course, other means for creating a drag could be used; for example, one of the washers 22 could be a dished spring washer or an external arm with or without a roller pivoted from the handle and biased toward the body could be used to exert a pressure on the roll of paper recording tape.

The body portion has a pair of slots 23 and 24 therein to allow the tape to be fed down from the top surface of the body portion 11 through slot 23 to the bottom surface and back again to the top surface through slot 24. A pair of guide means 25 and 26 are secured to body portion 11 by conventional securing means such as machine screws (not shown) and serve to guide the edges of the tape 15. A projection 27 is centrally located on the bottom surface of body 11 below the yoke 14 such that paper being fed through the guides is bulged out beyond a plane through the lowermost portion of the guides. The projection 27 may be of a resilient material such as rubber, if desired, to conform to irregular testing surfaces. The bulged portion of the paper below projection 27 is the area of the paper to receive the smear sample. In order to avoid contact of the smeared area with any portion of the instrument, an enlarged cut out portion 28 in slot 24 is provided and a cutting edge at 29 is utilized to tear the smeared portion of the paper.

The instrument has been described relative to a number of elements secured together to form a unitary device; however, it should be understood that the instrument may be made in a single piece of molded plastic which would allow for easy cleaning.

In order to utilize the device as a smear test sampler, a roll of standard paper recording tape 15 is secured in the yoke and threaded through slots 23, guides 25 and 26, and slot 24. The area around projection 27 may be outlined in pencil if no notations appear printed on the tape. The material to be smear tested is then rubbed with the instrument in a direction toward the user such that only that portion of the paper over projection 28 comes in contact with the material. Motion toward the user obviates the use of a clamp means on the body adjacent edge 29 since the binding action of the guides and projection on the paper may be made sufficiently great to avoid use of a clamp. The paper is then pulled through slot 24 until the contaminated portion is beyond edge 29. At this point the top of body portion 11 adjacent edge 29 may be used to write any identification of the test deemed necessary and then the paper, including the tested portion and identification information, is torn off to be tested for either radioactive or bacteriological contamination.

Although the invention has been described with reference to a particular embodiment, it will be understood to those skilled in the art that the invention is capable of a variety of alternative embodiments within the spirit and scope of the appended claims.

We claim:
1. A dispenser of tape suitable for use as a smear test sampler comprising a base, means on the upper side of said base for forming a holder for a supply roll of said tape, spaced means on the lower side of said base for engaging the edges of and guiding tape therealong, and means on said base between said spaced means for projecting a portion of a tape guided between said spaced means below a plane through the lowermost portion of said guide means, said means for projecting tape forming the lower-most portion of said dispenser.

2. A smear test sampler comprising a body, a holder for a supply roll of paper tape on one side of said body, guide means on the other side of said body located to engage the longitudinal edges of tape from said roll, means forming the bottom-most portion of said sampler mounted on said body between said guide means for projecting a portion of said tape between said guide means beyond the surface of said guide means remote from said body, and means for creating a drag on said roll of paper tape.

3. A device as defined in claim 2 including a slot in said body for directing said tape on the said other side of said body toward the said one side of said body.

4. A device as defined in claim 3 including an enlarged cut out portion in said slot in alignment with said means for projecting tape.

5. A device as defined in claim 3 including a cutting edge on said body adjacent to said slot.

References Cited in the file of this patent
UNITED STATES PATENTS

| | | |
|---|---|---|
| 909,599 | Hotchkiss | Jan. 12, 1909 |
| 1,131,591 | Baker | Mar. 9, 1915 |
| 2,178,722 | De Mattia | Nov. 7, 1939 |
| 2,673,042 | Fritzinger | Mar. 23, 1954 |
| 2,715,742 | Coles | Aug. 23, 1955 |
| 2,854,682 | Berezny | Oct. 7, 1958 |